2 Sheets--Sheet 1.
A. WALTER.
Hay-Loaders.
No. 153,866.  Patented Aug. 4, 1874.
FIG. I
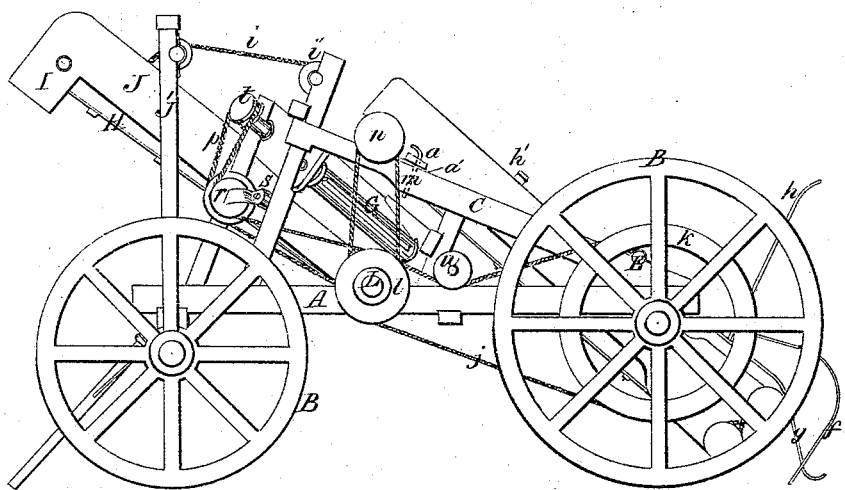
FIG. II  FIG VI
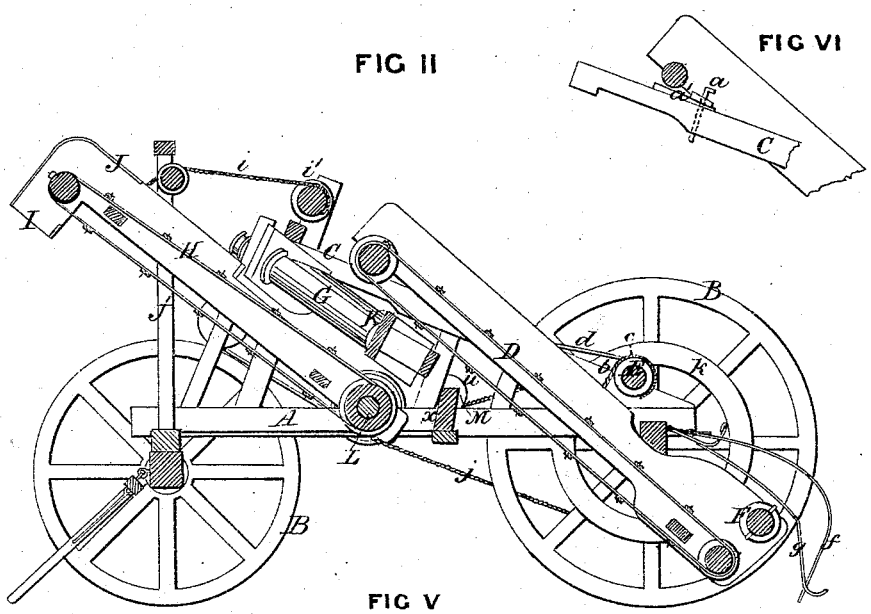
FIG V
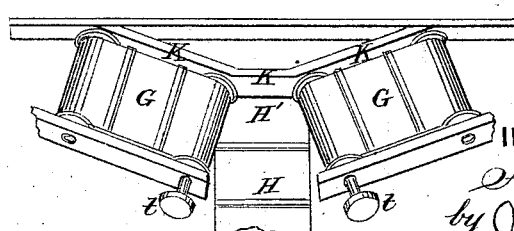
WITNESSES  INVENTOR 2 Sheets--Sheet 2.
A. WALTER.
Hay-Loaders.
No. 153,866. Patented Aug. 4, 1874.
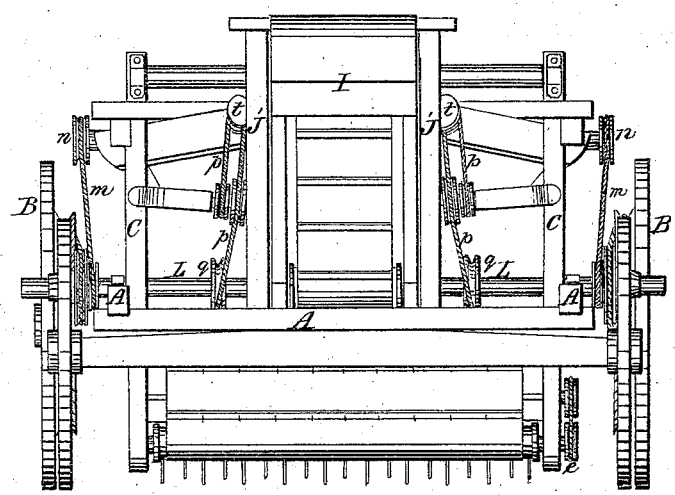
FIG IV
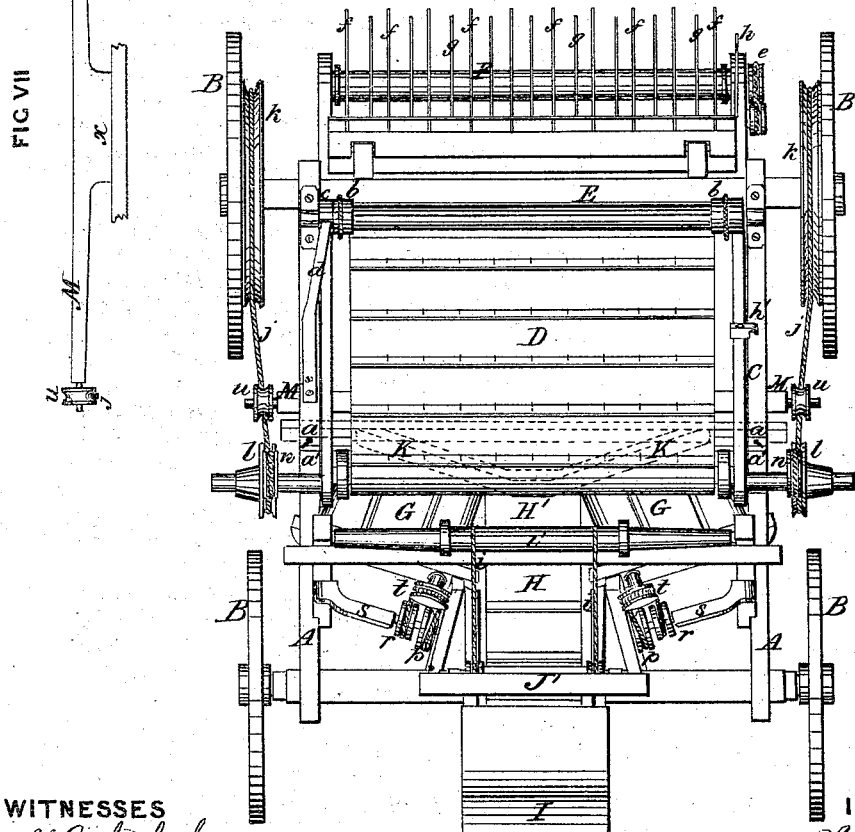
FIG III
FIG VII
WITNESSES
J. A. Rutherford
John E. Laing
INVENTOR
Amos Walter
by Johnson & Johnson
his Attorneys.
THE GRAPHIC CO. PHOTO-LITH. 39 & 41 PARK PLACE, N.Y.

UNITED STATES PATENT OFFICE.

AMOS WALTER, OF MIDDLEBURY, INDIANA.

IMPROVEMENT IN HAY-LOADERS.

Specification forming part of Letters Patent No. 153,866, dated August 4, 1874; application filed June 8, 1874.

*To all whom it may concern:*

Be it known that I, AMOS WALTER, of Middlebury, in the county of Elkhart and State of Indiana, have invented certain new and useful Improvements in Hay-Loaders; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention relates to machines for gathering and loading hay into racks, and the particular features of my said invention consist in the combination, with a lifting and carrying endless apron, of laterally-compressing endless aprons, and a central discharging endless apron, toward which the laterally-compressing aprons converge, by which combination and arrangement the hay is delivered from a wide lifting-apron and discharged upon the narrow side-converging aprons, which deliver and compress it upon the narrow central discharging-carrier through the chute into the receiving-rack, by which means the hay is transferred from a wide apron and gathered into a compact form in a comparatively narrow exit, and thereby is obtained a more complete control of its delivery from the machine. In the construction of such a machine, both the lifting and discharging aprons are made adjustable, and the converging and compressing aprons are combined with a guard which crosses the exit-apron at the compressing point, and the movements of the several aprons and their adjustments made in a manner as will be more fully described.

In the accompanying drawings, Figure 1 represents a side elevation of a hay-loader embracing my invention; Fig. 2, a vertical longitudinal section; Fig. 3, a top view; and Fig. 4, an elevation of the delivering end. Figs. 5, 6, and 7 are detached views.

The machine is attached to a hay rack or crib by a hook, connecting the tongue of the machine with the reach of the rack, and the combined machine is drawn by one and the same team. The frame A of the loader is mounted upon wheels B, the hind ones of which being the drive-wheels. A suitable frame-work, C, is reared upon the frame A, to sustain and carry the several operating endless slat-aprons—the frame of the lifting and carrying one D being attached by pivot-bolts *a* to the side rails of the top frame, so as to rise from near the surface of the ground in an inclined position, and its lifting end suspended by cords *b*, passing over a roller, E, by which this end of the apron may be adjusted higher or lower, as may be desired, and held in such position by a ratchet, *c*, on the roller, and a spring-pawl, *d*, on the frame C. An armed cylinder, F, has its bearings in the apron-frame, just above the lifting end, to gather the hay from a rake and throw it upon the apron, and this cylinder is operated by a crossed belt or chain, *e*, passing over pulleys on the end of the cylinder and the roller of the lifting-apron, as shown in Fig. 3. The rake has spring-teeth *f* and bearing-wires *g*, and it is hinged to the frame A, so as to gather the hay and bear it down upon the armed cylinder and the lifting-apron, and this spring can be turned up and secured by a lever, *h*, and catch *h'*, in going to and from the field. Just beneath the elevated end of the lifting-apron D, I arrange two side endless slatted narrow aprons, G, (see Fig. 5,) extending from the outer sides of the apron D and converging in oblique positions toward and terminating at the sides of a narrow endless apron, H, which extends outwardly and centrally from said side aprons, so that the hay raised by the lifting-apron is delivered directly upon the three aprons G G H at their junction H', where it is compressed by the converging movement of the side aprons upon the central apron, and thus brought into a compact body, which places it under better control and greatly facilitates its discharge through a chute, I, secured to the end of the frame J, which carries the apron H, and into which it terminates over the rack, so that the hay is delivered from a wide lifting-apron in a narrow stream, through the bottom or mouth of the chute, into the rack. The compressing-aprons are mounted upon suitable rollers, and they are guarded along their lower edges by a guard, K, secured to the frame C, and extending across the central apron H, to hold the hay in the compressing movement of the aprons and in position to be carried off. The chute-frame J is mounted loosely at its lower end upon a shaft, L, which has its bearings in the main frame, and the chute end is suspended by cords $i$, passing over a windlass-sheave, $i'$, mounted in the top frame C, so that by turning the windlass the chute is raised and lowered and held as may be desired in filling the rack, the point of suspension for the chute being in a frame, $J'$, between the standards of which the chute-frame extends and is held. The several aprons described derive their movements from sheaves on the main shaft L, which is driven by belts or chains $j$ leading from sheaves $k$ on the drive-wheels to sheaves $l$ on the said shaft; and to keep these drive-chains $j$ taut I arrange a spring-bar, M, upon a seat, $x$, across the main frame, with sheaves $u$ $u$ upon each end, bearing with the force of the spring upon said cords, as shown in Figs. 1 and 7. The lifting and carrying apron is driven by chains $m$, leading from sheaves $n$ on the upper roller of said apron to sheaves on the main shaft L, and when the lower end of this apron is raised or lovered its upper end is correspondingly adjusted by wedges $a'$, upon which the apron-frame rests, and through which the pivot-bolts $a$ pass, for the purpose of keeping the chains $m$ always taut. (See Fig. 6.) In adjusting the wedges, the pivot-bolts $a$ are removed and the wedges moved up or down and again secured. The converging and compressing rollers are driven by chains $p$, leading from sheaves $q$ on the shaft L, over the sheaves $r$ on arms $s$, and round sheaves $t$, on the front ends of the inner apron-rollers; and, this arrangement of the sheaves being on either side of the chute-frame, they are therefore out of the way of the discharging hay.

I claim—

1. The combination, in a hay-loader, of the lifting and carrying apron D with the lateral compressing-aprons G G and the central discharging-apron H, substantially as described, whereby the hay is received from a broad apron and compressed at the junction $H'$ of the aprons while in transit to a chute-apron.

2. The lifting and carrying apron D, hung at its upper end by the bolts $a$, in combination with the adjustable wedge $a'$ and the adjusting and holding roller E, and suspending-chains $b$ for its lower end, as described, whereby the said apron is adjustable at both ends to keep its driving-chain taut.

3. The chute-frame J, hung loosely upon the main driving-shaft L, which drives its apron, in combination with the discharging-chute I, the cords $i$, windlass-roller $i'$, and guide-frame $J'$, by which it is held in position and made adjustable over the hay-rack.

4. In a hay-loader constructed and operating substantially as herein described, the spring cross-bar M, having a fixed seat, $x$, in combination with the pressure-roll $u$ $u$ carried thereby, and the drive-chains $jj$, as and for the purpose described.

5. The converging guard K, in combination with compressing and the discharging aprons G G H, as described, whereby the compacting of the hay is effected upon the discharging-aprons.

In testimony that I claim the foregoing as my own I have affixed my signature in the presence of two witnesses.

AMOS WALTER.

Witnesses:
CHAS. W. WALKER,
FREDERICK COPELAND.